United States Patent

[11] 3,628,160

[72] Inventor John R. Pickering
Hatch End, England
[21] Appl. No. 887,067
[22] Filed Dec. 22, 1969
[45] Patented Dec. 14, 1971
[73] Assignee Dana Laboratories, Inc.

[54] CONVERTER SYSTEM
15 Claims, 10 Drawing Figs.

[52] U.S. Cl. .................................................. 328/144, 307/229
[51] Int. Cl. ................................................... G06g 7/20
[50] Field of Search ........................................... 328/144; 307/229

[56] References Cited
UNITED STATES PATENTS

| | | | |
|---|---|---|---|
| 3,005,113 | 10/1961 | Schmid et al. ................. | 328/144 |
| 3,113,274 | 12/1963 | Utt ................................. | 328/144 |
| 3,121,200 | 2/1964 | Samson ......................... | 307/229 |
| 3,484,593 | 12/1969 | Schmoock et al. ............ | 307/229 |

OTHER REFERENCES

" Curve Fitter Aids Measure of RMS by Overruling Square Law Slowdowns," by Ochs & Richman, Electronics, September 29, 1969, pages 98–101. (cited by Applicant)

*Primary Examiner*—Donald D. Forrer
*Assistant Examiner*—Harold A. Dixon
*Attorney*—Nilsson, Robbins, Wills and Berliner ABSTRACT: A system which may have applied thereto a DC or an AC signal and the output of which is a DC signal which follows substantially a predetermined function. The output signal is caused to follow substantially the predetermined function by application to the input signal of a dither signal which, under some circumstances, may be frequency modulated. In a preferred embodiment, the system is an AC to DC RMS converter utilizing operational rectifiers the output of which is applied to a dither generator which produces an output signal having a substantially linear probability distribution function (a triangular wave), and which output is applied as an input signal to the operational rectifiers to vary the conduction level thereof so as to cause the system output signal to more closely follow the square-law curve. In an alternative embodiment, comparators are used instead of operational rectifiers.

Patented Dec. 14, 1971

INVENTOR.
JOHN R. PICKERING.
BY
Nilsson & Robbins
Attorneys

Patented Dec. 14, 1971

INVENTOR.
JOHN R. PICKERING
BY
Nilsson & Robbins
Attorneys

Patented Dec. 14, 1971

INVENTOR.
JOHN R. PICKERING.
BY
Nilsson & Robbins
Attorneys

CONVERTER SYSTEM

BACKGROUND OF THE INVENTION

It is known in the prior art to cause the output of a converter circuit to more closely approach, or approximate a desired output function through the utilization of a "curve-fitting" technique whereby the output signal of the converter follows a segmented straight line approximation of the desired output curve. An excellent example of such a system is disclosed in the article entitled "Curve Fitter Aids the Measure of RMS By Overruling Square-law Slowdowns" by Gene Ochs and Peter Richman which appeared in the magazine "Electronics" dated Sept. 29, 1969, pages 98 through 101.

Such prior art systems operate exceedingly well when compared to their predecessor systems; however, since the output of such systems follow segmented straight lines, as opposed to closely approximating the desired output function, there are inherent errors resulting therefrom.

SUMMARY OF THE INVENTION

A converter system including means for providing an output DC signal following a straight line approximation of a predetermined function and having connected to the input thereof means for applying a signal having a predetermined probability distribution function to amplitude dither the applied unknown signal a predetermined amount thereby to cause the output to more closely approximate the desired function. The dither signal may be provided in a feedback circuit by applying the output signal from the converter system to a dither generator, the output of which is then applied to a curve fitter. Means may also be provided to modulate the dither signal thereby to preclude development of beat frequencies between the dither signal and the input signal for any sustained period of time.

DESCRIPTION OF THE INVENTION

Figure 1:
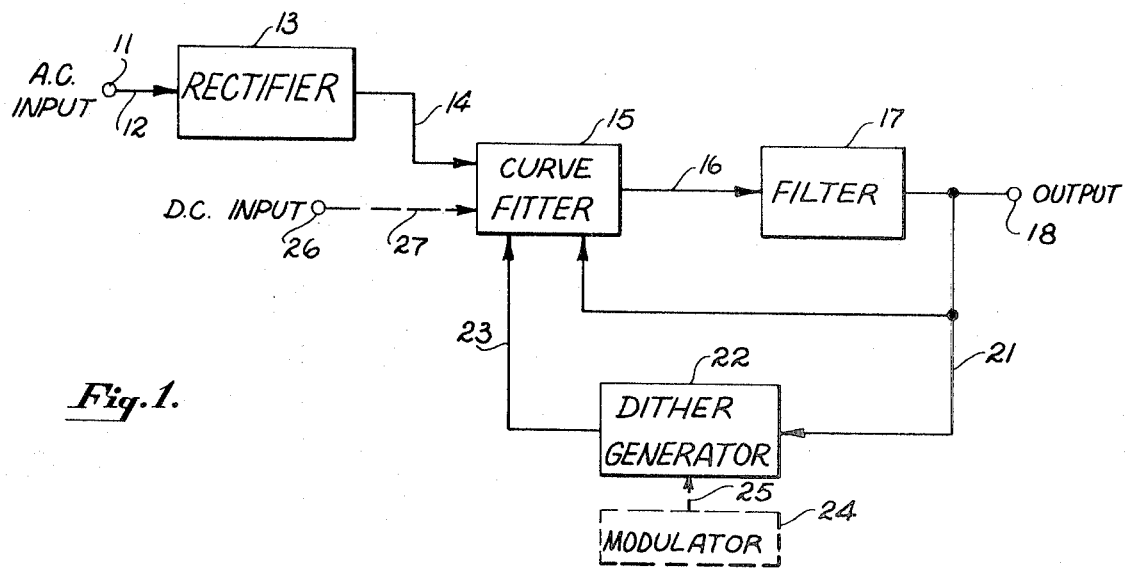
FIG. 1 is a block diagram generally illustrating a system in accordance with the present invention.

Referring now to the drawings, and more particularly to FIG. 1, there is illustrated in block form a generalized system pursuant to the present invention. It should be expressly understood that the present invention is an improvement upon a system of the type disclosed in the Ochs and Richman article above referred to. As is therein disclosed, there is provided a system which converts an AC input signal to a DC output signal which approximates the square-law curve ($Y=X^2$) through causing the output signal to take the form of a segmented straight line approximation to the square-law curve. Such is accomplished by rectifying the input signal and applying the same to a curve fitter. The curve fitter is an operational rectifier which has the system output DC signal fed back to it to vary its conduction level proportionally to the output DC signal. In this manner the break points on the straight line approximation to the square-law curve are varied thereby to better approximate the square-law curve. Thus, through the utilization of the feedback circuit, the break points change with changes in output signal thereby to maintain the systems accuracy irrespective of the amplitude of the input signal.

As shown in FIG. 1, when an AC input signal is utilized in accordance with the present invention, the same may be applied to a terminal 11 which is connected by way of the lead 12 to a rectifier 13, which preferably is an operational rectifier. The output of the rectifier 13 is then applied through lead 14 to a curve fitter 15. The output of the curve fitter 15 is applied by way of lead 16 to a filter 17, the output of which is the output signal of the system and appears at terminal 18. As illustrated, the output of the system is also applied by way of the lead 19 as a feedback signal to the curve fitter 15. Insofar as the circuit shown in FIG. 1 is thus far described, it is the system described in the above referred to Ochs and Richman article. In accordance with the present invention, the output signal is also applied by way of the lead 21 to a dither generator 22. The output of the dither generator 22 is then applied by an additional lead 23 as an additional feedback signal to the curve fitter 15. Through application of each of the feedback signals, both the output signal and the dither generator signal through proper weighting and through proper selection of the probability distribution function of the output signal from the dither generator, the output signal from the system can be caused to more closely approximate the desired output function.

In some instances, for example, where the frequency of the feedback signal applied by the lead 23 from the dither generator 22 approaches the frequency of the input AC signal applied to the terminal 11, or a major harmonic thereof, it has been found that a beat signal is generated which may introduce unwanted errors in the output signal of the system. To compensate for this problem, which generally only is found where very wide band systems are desired, a modulator as shown in dashed lines 24 may be utilized. The modulator generates a signal which is applied over the dashed lead 25 as a control signal to the dither generator. The control signal from the modulator causes the output signal appearing on the lead 23 to vary in frequency at a predetermined rate thereby eliminating the possibility of a beat signal being generated for any substantial period of time as compared to the time during which a particular measurement is being taken by the system.

Under some circumstances, it is desirable to have the output of such a converter system follow a logarithmic or a reciprocal function, as opposed to a square-law function as above mentioned. Under these circumstances, the input signal would be a direct current signal which, if desired, may be applied to a terminal 26 and applied over the lead 27 as an input signal directly to the curve fitter 15. Under these circumstances, the rectifier 13 and its appropriate interconnections would not be utilized. Such is intended to be illustrated by placing the lead 27 in dashed configuration.

As above indicated, although the present invention is generic to any application wherein the output of a converter is to follow a predetermined function which can be approximated by a straight line segmented curve, the remainder of the description will be specifically directed to a system, the output of which is to approximate the square-law curve. Such square-law curve is generally shown in FIG. 2 to which reference is hereby made.

Figure 2:
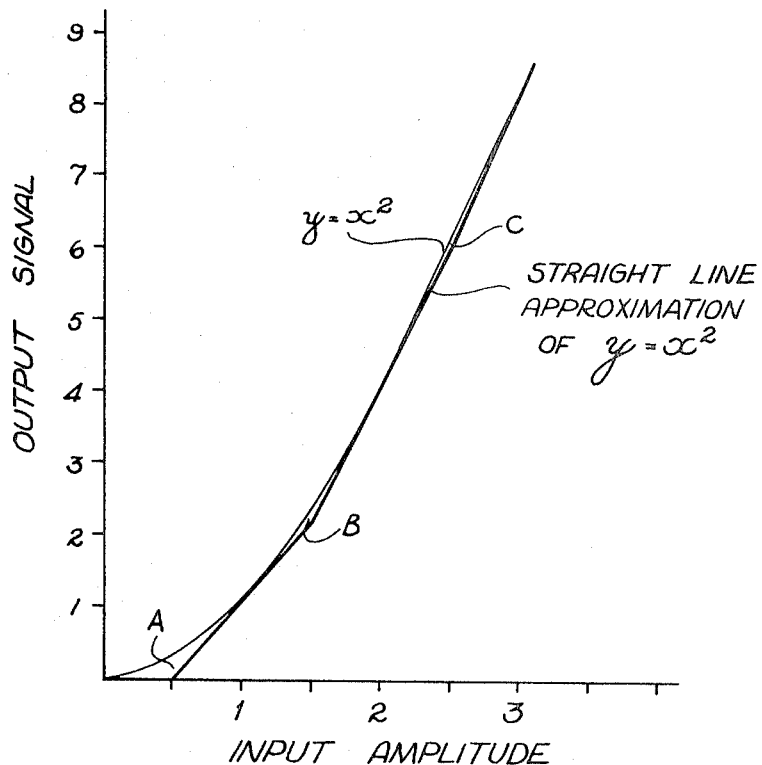
FIG. 2 is a graph illustrating one form of function which a system in accordance with the present invention may be constructed to follow.

As is shown in FIG. 2, the abscissa represents the input amplitude of a signal which might be applied to a circuit of the type illustrated in FIG. 1 while the ordinate illustrates the output signal appearing at the terminal 18. As is illustrated, the desired function is the square-law curve $Y=X^2$ from which the RMS value of an applied AC input signal may be obtained in the manner taught by the Ochs and Richman article, supra. As is shown by the additional curve in FIG. 2, the square-law curve may be approximated by a segmented straight line curve which is labeled "Straight line approximation of $Y=X^2$" on FIG. 2. It will become readily apparent that in those areas where the break points, that is, where the slope of the straight line curve changes, occurs there is a wider separation between the square-law curve and the segmented straight line approximation thereof. This can be particularly seen at the points labeled A, B and C, for example, in FIG. 2. Such deviations from the square-law curve introduces undesired errors in the output signal appearing at the terminal 18. It is such deviations which the present invention overcomes. That is, by application of the output of the dither generator 22 as shown in FIG. 1 as a feedback signal to the curve fitter 15, the straight line segmented approximation is caused to more closely (within tolerances of components) approximate the square-law curve, mathematically, it will theoretically exactly duplicate the curve, as will be more fully demonstrated and proven hereinbelow.

Figure 3A:
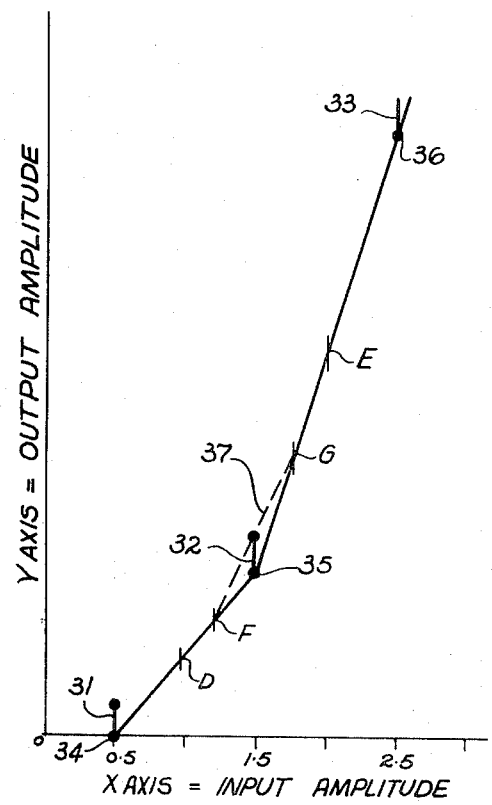
FIGS. 3a, 3b, 3c and 4 are graphs illustrating the results of the application of dither in accordance with a system of the present invention.

For purposes of further illustration and description of the present invention, reference is made to FIG. 3a. FIG. 3a represents one form which a segmented straight line approximation of the square-law curve ($Y=X^2$) may take. When utilizing such a curve if the break points are chosen such that the errors introduced by such an approximation are a regular function of $X$, then by choosing an additional signal to mix with the input signal, which additional signal has the proper probability distribution function, the errors introduced by the segmented straight line approximation may be substantially reduced. By the term "a regular function of $X$" is meant that the error which is introduced by the straight line approximation to the square-law curve when plotted along the X-axis, representing the input amplitude, as opposed to the Y-axis, representing the output amplitude, produces a series of curves having equal amplitude and shape spaced at equal intervals along the X-axis. Thus, as is shown in FIG. 3, which as known to those skilled in the art, discloses only that half of the square-law curve appearing on the positive half of the X-axis, and which is duplicated on the negative half thereof, the break points, that is, those points at which the slope of the straight line is changed so as to approximate the square-law curve, are chosen to fall at equal intervals spaced one unit apart (the units being chosen as some arbitrary length as may be desired) along the X-axis. Thus, on the positive side, as illustrated in FIG. 3, the break points are chosen to fall at 0.5, 1.5 and 2.5 units. If a square-law curve is superimposed upon the straight line approximation thereof, as shown in FIG. 2, it can be shown that the errors introduced by the segmentation of the straight line are equal at the break points. In other words, the errors introduced are shown as the spikes 31, 32 and 33 appearing at the break points 34, 35 and 36 respectively. Furthermore, if one were to plot the amount of error introduced by the straight line approximation in between the break points, it would be found that it would go to zero at the midpoint between the break points and rise to the maximum at the break points in a regular fashion.

Under these conditions, the square-law curve may be approximated by the plurality of interconnected straight lines following the equations set forth as:

from 0 to the break point 34, $Y=0$;
from the break point 34 to the break point 35, $Y=2X-1$;
from the break point 35 to the break point 36, $Y=4X-4$;
from the break point 36 to the next succeeding break point appearing at $X=3.5$ but not shown on the graph otherwise, $Y=6X-9$.

The general form of the equation representing the straight line segments is:

$Y=mX-K$, where $m$ is increased by successive equal increments and $K$ is a constant such that each successive straight line segment intersects the previous straight line segment at equal intervals of $X$.

Figure 3B:
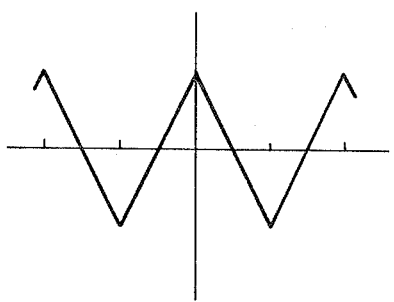
Figure 3C:
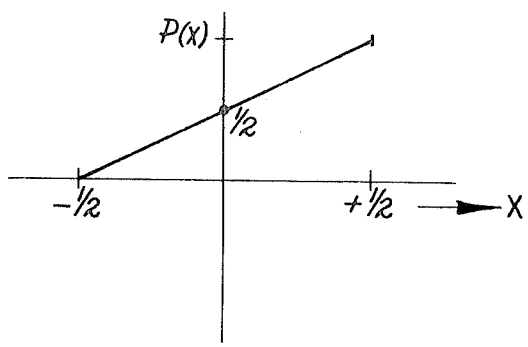

If the straight line approximation shown in FIG. 3, meeting the requirements set forth above, is chosen as the approximation to $Y=X^2$ then, through the selection of a dither signal to be added to the input signal, as plotted along the X-axis shown in FIG. 3a, having a linear probability distribution function, it can be shown that the errors introduced by the straight line approximation, as indicated at 31, 32 and 33, may be substantially reduced. A waveform having a linear probability distribution function is a triangular waveform. A sawtooth waveform is another example of a waveform having a linear probability distribution function. A triangular waveform of the type above referred to is shown in FIG. 3b. The probability distribution function of the triangular waveform as shown in FIG. 3b is shown in FIG. 3c. The equation for the line shown in FIG. 3c is:

(1) $P_{(x)}=X+\frac{1}{2}$ where $P_{(x)}$ is defined as the probability distribution function of $X$, that is, the integral of the probability density function of $X$.

Assuming now that a triangular waveform, thus a waveform having a linear probability distribution, is mixed with the input signal applied to a curve fitter as shown in FIG. 1, and that the triangular waveform has a peak-to-peak amplitude of one unit as maintained by the output signal, as more fully described below. If one wishes to ascertain the contribution to the output amplitude which such a triangular waveform would provide, such may be done by analysis of the straight line approximation in FIG. 3a and determining, for example, what the contribution would be if the input amplitude appears precisely at the break point 35. Under these circumstances, the triangular waveform will appear on that part of the curve between break points 34 and 35 as shown between D and 35 and will also appear on that portion of the curve between break points 35 and 36 as shown between 35 and the point E. By considering all probabilities as to where the triangular waveform might appear on the X-axis at that instant when the input amplitude is at 1.5, it can be seen that the triangular waveform could possibly cause the output amplitude to increase to a point as high as that shown at point E, or decrease to a point as low as that shown at point D on the segmented curve. Since the triangular waveform has a linear probability distribution, and since we are considering the instantaneous condition of the input amplitude being at 1.5 on the X-axis, one is concerned only with the mean value of the possible contribution of the triangular waveform. Such mean value may be ascertained by finding the mean between D and 35 and the mean between 35 and E. In each instance, such is shown at F and G respectively. By then interconnecting points F and G by a straight line as shown by dashed line 37, one can see that the line 37 falls in such a manner as to coincide with the error 32 contributed by the straight line approximation to the square-law curve. Therefore, if the triangular waveform mixed with the input amplitude contributes an amount equal to the error 32 at the break point 35, then the error 32 is compensated for and the straight line approximation is caused to coincide with the true square-law curve.

If one were to take the opposite extreme from the case just described and plot on FIG. 3a the contribution to the output amplitude of the triangular wave, by assuming an instantaneous value of the input amplitude halfway between the break points so that the entire triangular wave contribution would necessarily fall on only one segment of the straight line approximation, then an analysis similar to that above carried out will disclose that the contribution of the triangular wave would be zero. Such occurs because the probability of the waveform being above or below the point on the X-axis chosen for analysis, is exactly the same (as was the case above) and the slope of that segment of the curve remains constant throughout.

Figure 4:
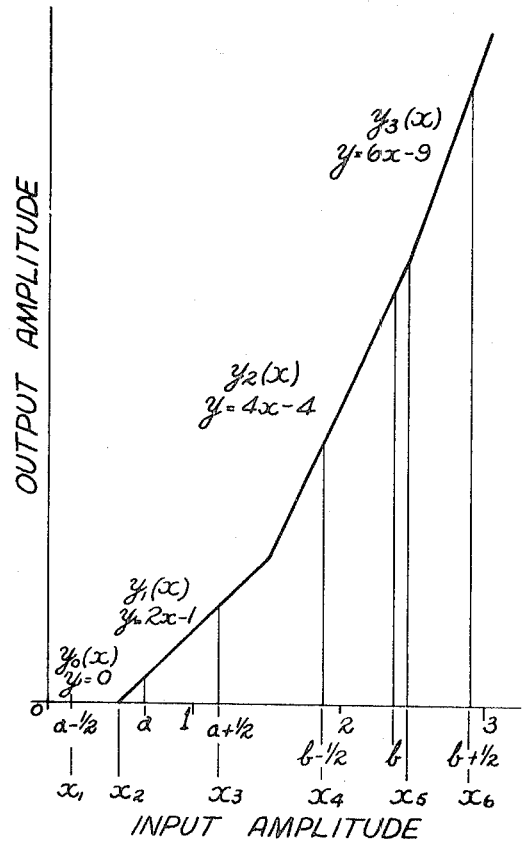

The foregoing analysis made with respect to FIG. 3a may also be accomplished by mathematically calculating the contribution of a triangular wave such as that shown in FIG. 3b when applied to a segmented straight line approximation of the square-law curve wherein each of the straight line segments follows the general equation above set forth. Such a calculation is set forth below and is applied to such a straight line approximation as shown in FIG. 4. Such calculation will show, as was graphically done above, that the contribution at any instantaneous input amplitude to the output amplitude ($Y$) over a range of input amplitude ($X$) between some predetermined limits (the peak-to-peak amplitude of the triangular waveform) is a function of the mean value of the signal over that range multiplied by the probability that the signal is actually within that range.

The straight line segment over which one would be calculating the contribution of the triangular waveform is given by the equation:

(2) $\quad Y = f_{(x)} \equiv Y(x)$ where $f_{(x)}$ is defined as some function of $X$;

If one then choses some range of $X$ over which the contribution to $Y$ of the triangular signal is to be calculated, such as from $l$ to $m$, then such contribution will be given by the equation:

(3) $\quad Y_{(p)} = f\left(\dfrac{l+m}{2}\right) \cdot (P_{(m)} - P_{(l)})$ where $Y_{(p)}$ means the contribution to the output amplitude $Y$ at any given point ($p$);

$l$ is the lower limit of the range of the triangular waveform on $X$;

$m$ is the upper range thereof;

$P_{(m)} - P_{(l)}$ is the probability that the combination of the instantaneous value of input amplitude plus the triangular wave lies between the range $l$ to $m$.

Assuming now for purposes of the calculations above referred to that the instantaneous input amplitude which it is desired to measure lies at point $a$ on the X-axis as shown in FIG. 4. Since the triangular waveform mixed with the input amplitude has a peak-to-peak amplitude of one unit as defined by the output amplitude, then the combined signal has a lower limit of $a-\frac{1}{2}$ and an upper limit of $a+\frac{1}{2}$ on the X-axis. For purposes of calculation, the lower limit will be designated $X1$, the break point between the segments $Y=0$ and $Y=2x-1$ will be designated $X2$, and the upper limit will be designated $X3$. In order to calculate the total contribution of the triangular wave to the input amplitude at point $a$, the contribution over each of the straight line segments affected must be calculated and then the two added together. Thus, the contribution over that portion of the curve $Y=0$ between the points $X1$ and $X2$ would be given by:

(4) $\quad Y_{0(x)}\left(\dfrac{X_1+X_2}{2}\right) \cdot (P_{(x2)} - P_{(x1)})$ where $Y_{0(x)}$ is that portion of $Y$ expressed as the function of $X$ where $X$ lies between $X1$ and $X2$.

The contribution of the triangular wave to the output amplitude between $X2$ and $X3$ is given by:

(5) $\quad Y_{1(x)}\left(\dfrac{X_2+X_3}{2}\right) \cdot (P_{(x3)} - P_{(x2)})$ where $Y_{1(x)}$ is that portion of $Y$ expressed as the function of $X$ where $X$ lies between $X2$ and $X3$.

From FIG. 4 we have:

(6) $\quad Y_0(x)=0, \ Y_1=2X-1$ $X1=a-\frac{1}{2}, \ X2=\frac{1}{2}, \ X3=a+\frac{1}{2}$ and from equation 1 we have:

$P(x2)-P(x1)=X2-X1; \ P(x3)-p(x2)=X3-X2$

By substituting into the equations (4) and (5) above set forth we then can determine the total contribution of the triangular wave between $X1$ and $X3$ as follows:

(7)

$Y_{(a)} = 0\left[\dfrac{(a-\frac{1}{2})+\frac{1}{2}}{2}\right] \cdot [\frac{1}{2} - (a-\frac{1}{2})]$ $\qquad + \left[2\left(\dfrac{\frac{1}{2}+a+\frac{1}{2}}{2}\right) - 1\right] \cdot [a+\frac{1}{2}-\frac{1}{2}]$ Then by multiplying through it can be seen that:

(8) $\quad Y_{(a)} = a^2$ which will be recognized as the equation for the square-law curve. Thus, since the total contribution from $X1$ to $X3$ of the triangular waveform is such that the output amplitude is the square of $a$, a true RMS conversion from the input amplitude to the output amplitude of the alternating current signal at $a$, whose RMS value it is desired to obtain in accordance with the specific case of the present invention currently under discussion may be determined as set forth in the Ochs and Richman article, supra.

As a second case for further consideration by way of additional illustration of the present invention, a point $b$ on the X-axis will now be chosen and the analysis above set forth in respect of point $a$ applied thereto. One purpose for further illustrating the present invention by utilization of the point $b$ is to take a case wherein the contribution to $Y$ is over a portion of the straight line segmented curve such that the equation $Y=f_{(x)}$ is not 0.

Again by reference to FIG. 4, the point $b$ is illustrated and the upper and lower limits of $b$ will be $b-\frac{1}{2}$ and $b+\frac{1}{2}$. The point $b-\frac{1}{2}$ on the X-axis will be designated $X4$. The break point between the upper and lower limits will be designated $X5$, and the upper limit $X6$ as shown in FIG. 4. By now applying the same reasoning with respect to point $b$ as was applied with respect to point $a$, we obtain the total contribution to $Y$ from the triangular waveform mixed with the input signal as follows:

(9) $\quad Y_{(b)} = Y_{2(X)}\left(\dfrac{X_4+X_5}{2}\right) \cdot (P_{(X5)} - P_{(X4)})$ $\qquad + Y_{3(X)}\left(\dfrac{X_5+X_6}{2}\right) \cdot (P_{(X6)} - P_{(X5)})$ from FIGURE 4, it can be seen that:

$X_4 = b-\frac{1}{2}, \ X_5 = 2\cdot 5, \ X_6 = b+\frac{1}{2} \ Y_{2(X)}$ $\qquad = 4X-4, \ Y_{3(X)} = 6X-9$ then by substituting we have:

(10) $\quad Y_{(b)} = \left[4\left(\dfrac{b-\frac{1}{2}+2\cdot 5}{2}\right) - 4\right] \cdot [2\cdot 5 - (b+\frac{1}{2})]$ $\qquad + \left[6\left(\dfrac{2\cdot 5+b+\frac{1}{2}}{2}\right) - 9\right] \cdot [b+\frac{1}{2} - 2\cdot 5]$

(11) $\quad Y_{(b)} = [2(b+2-4) \cdot [3-b] + [3(3-b) - 9] \cdot [b-2]$

(12) $\quad Y_{(b)} = b^2$

Thus, again it is shown that the total contribution of the triangular wave at the point $b$ is such that the output amplitude conforms to the square-law curve thus causing the substantial elimination of any errors introduced by the straight line approximation as above referred to.

Figure 5:
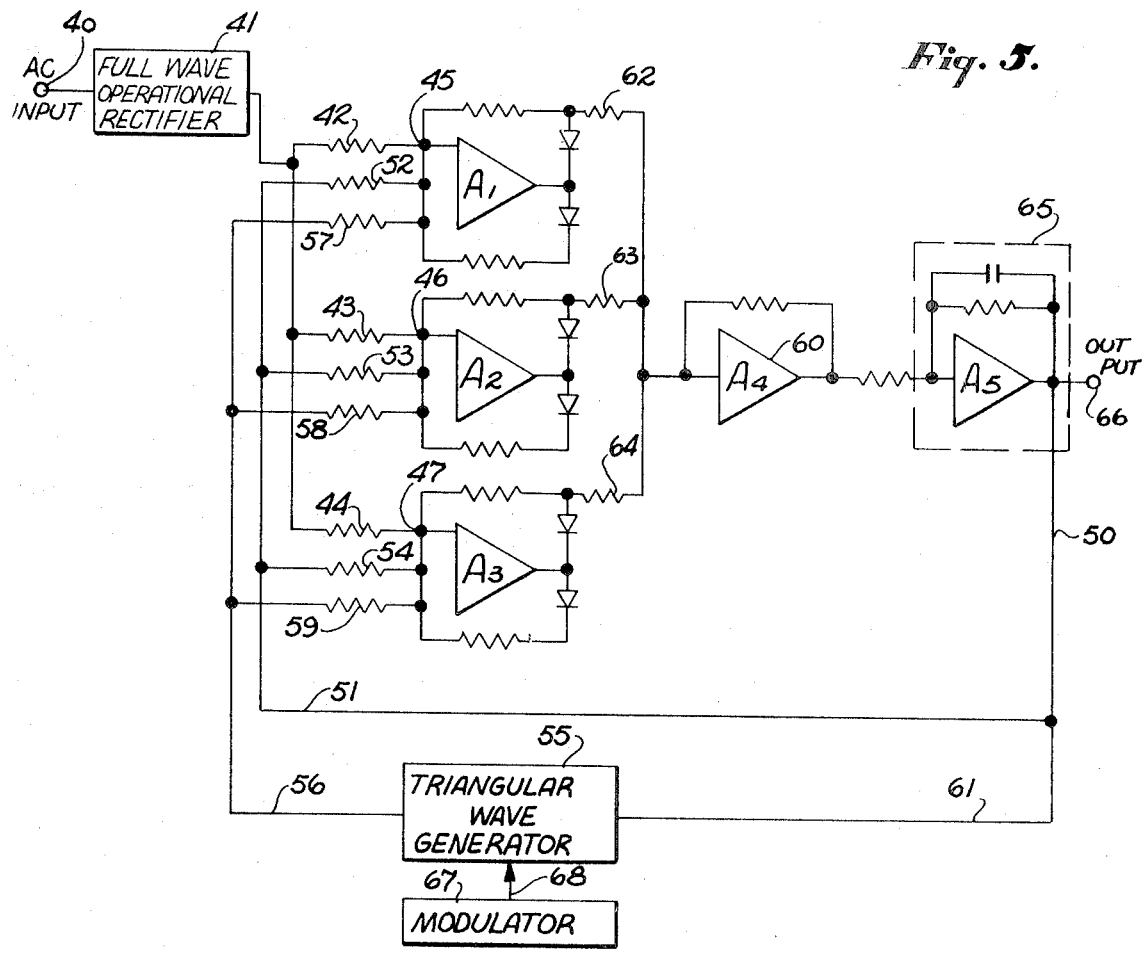
FIG. 5 illustrates in schematic form, one system constructed in accordance with the present invention.

By referring now to FIG. 5 there is illustrated in schematic form a circuit which manifests the various considerations above set forth in arriving at the affect which the mixing of a dither signal having a predetermined distribution function with the input signal would have on the output thereof. Again, the circuit shown in FIG. 5 is one designed to obtain the RMS value of an alternating current input signal.

As is illustrated in FIG. 5, a full wave operational rectifier 41 has applied to the input terminal 40 thereof an alternating current input signal the RMS value of which is to be determined. The output of the full wave operational rectifier is then applied through summing resistors 42, 43 and 44 as inputs to the input terminals 45, 46 and 47 of the amplifiers A1, A2 and A3 respectively.

An operational rectifier of the type referred to herein is well known in the prior art and, for example, such an operational rectifier is illustrated in U.S. Pat. No. 3,480,794 and no further description thereof is deemed necessary at this point.

As is also shown, the DC output signal appearing on the lead 50 is also applied by way of the lead 51 and the summing resistors 52, 53 and 54 as an input signal to the terminals 45, 46 and 47 of the amplifiers, A1, A2 and A3.

As previously described, the system thus far discussed and shown in FIG. 5 conforms to and operates as described in the Ochs and Richman article previously referenced. That is, the amplifiers A1, A2 and A3 along with their respective diodes and circuitry would conform to the curve fitter as therein described and would provide the segmented line approximation of a square-law curve as illustrated and described previously in FIGS. 2, 3 and 4 hereof. Thus, the circuit as shown in FIG. 5 would provide a segmented straight line approximation of the square-law curve having three break points therein, and by the proper weighting of the summing resistors 52, 53 and 54 these break points would be selected to fall at equal intervals on the X-axis as above described. Furthermore, as also described in the Ochs and Richman article, since the break points are determined by feeding back the output DC signal as the output signal decreases in value, the break points move closer to the origin thus retaining the accuracy of the system irrespective of the magnitude of the input signal.

As is illustrated in FIG. 5 and pursuant to the present invention, a triangular wave generator 55 has its output signal applied by way of lead 56 and the summing resistors 57, 58 and 59 as an input signal applied to the terminals 45, 46 and 47 of the amplifiers A1, A2 and A3 respectively. As will be described more fully hereinafter, the triangular wave generator 55 has applied as an input signal to the lead 61 thereof, the DC output signal of the system. The utilization of the DC output signal as an input to the triangular wave generator limits the peak-to-peak amplitude of the triangular wave appearing on the lead 56 to the amplitude of the DC output signal. Thus, as the break points on the segmented straight line approximation of the square-law curve are caused to change as the value of the DC output signal changes, the amplitude of the triangular wave which is applied is also caused to change accordingly.

The amplifiers A1, A2 and A3 are operational amplifiers which, when associated with the diodes and resistors as illustrated, form operational rectifiers of the type above described and referenced. The output of the operational rectifiers represented by the amplifiers A1, A2 and A3 are then applied through summing resistors 62, 63 and 64 to an inverting amplifier 60 the output of which is applied to the active filter 65, the output of which appears at terminal 66 and is the DC output signal of the system.

In operation, the AC input signal applied to terminal 40 is rectified and appears at the output of the rectifier 41 as a typical full wave rectified signal. After summing with the feedback signal applied with the proper weighting and with the dither signal also fed back, the input to each of the amplifiers A1, A2 and A3 appears at the full wave rectified signal shifted by the amount of the feedback appearing on lead 51 and further shifted by the amount of feedback applied through the lead 56. Thus, the signal appearing, for example, across the resistor 62 would be that part of the negative going half cycles appearing across the resistor 42 above the bias established by the signals appearing across the resistors 52 and 57. The signals appearing across the resistors 63 and 64 would be similar in structure. The sum of these signals, after filtering by the active filter 65, would then be the straight line segmented approximation to the square-law curve corrected by the application of the triangular signal so as to very closely approximate the square-law curve as above described.

So long as the frequency of the triangular wave generated by the triangular wave generator 55 differs substantially from the frequency of the AC input signal applied to terminal 40, then little or no difficulty is experienced from any beating between the AC input signal and the triangular wave. However, should there be coincidence between the input signal and the triangular wave frequencies, then some undesired errors may be introduced as a result of the beating therebetween. As a result thereof, a modulator 67 may be added and the output thereof also applied to the triangular wave generator 55 over the lead 68. The modulator 67 output is utilized to vary the frequency of the signal developed by the triangular wave generator to thereby preclude any substantial period of time during which there might be a coincidence between the frequency of the AC input signal and the frequency of the waves generated by the triangular wave generator.

Figure 6:
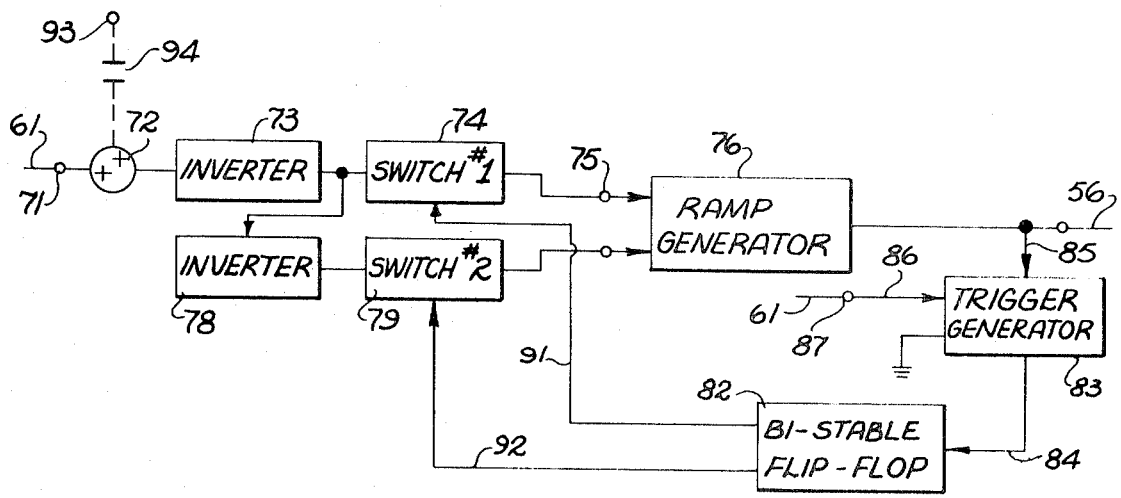
FIG. 6 illustrates in block diagram one form which a dither generator, constructed in accordance with the present invention, may take where the dither signal has a linear probability distribution.

By reference now to FIG. 6, there is illustrated in block form a triangular wave generator usable in accordance with the present invention. As is shown in FIG. 6, the input signal to the triangular wave generator is applied by the lead 61 (from FIG. 5). This is recognized as being the DC output signal from the system. The DC signal is applied to the terminal 71 which is in turn connected to the summing junction 72 the output of which is connected to a first inverter 73. The output of the inverter is applied to a first switch 74, the out of which is in turn applied to one input terminal 75 of a ramp generator 76. The output of the inverter 73 is applied over the lead 77 to a second inverter 78. The output of the second inverter 78 is supplied to a second switch 79, the output of which in turn is applied to a second terminal 81 of the ramp generator 76. The first and second switches 74 and 79, respectively, are caused to be open or closed by a flip-flop 82. The flip-flop 82 is bistable and is caused to change states by a trigger generator 83 connected thereto by way of the lead 84. The trigger generator is connected by way of the lead 85 to the output of the ramp generator and also by way of the lead 86 to a terminal 87 which in turn is also connected to the output of the system which appears on the lead 61. The DC output signal being connected to the terminal 87 operates as a reference signal for the trigger generator 83. Thus, as the output signal from the ramp generator 76 passes through the DC reference applied to the terminal 87, a pulse is generated which is applied to the flip-flop 82 causing it to change states. Upon the change of states of the flip-flop 82, the ramp generator reverses direction and continues to produce an output signal until the opposite reference (ground in this embodiment) is reached at which point in time the trigger generator 83 again produces a pulse which causes the flip-flop 82 to again change state.

The reversing of direction of signal generated by the ramp generator 76 is accomplished through the conduction or nonconduction states of the first and second switches 74 and 79. The state of the switches is determined by the state of the flip-flop 82. That is, when the flip-flop is in one state, the signal applied over the lead 91 to the switch 74 causes that switch to be conductive thereby applying the output of the inverter through the switch 74 as an input to the terminal 75 of the ramp generator 76. When the state of the flip-flop is in the other state, then the signal applied over the lead 91 causes the switch 74 to be in the off condition and, therefore, no signal is applied to the terminal 75. On the other hand, when the flip-flop is in its other state the signal applied over the lead 92 causes the second switch 79 to be in its on condition thereby applying the output of the inverter 78 (which is opposite in polarity to the output of the inverter 73) through the closed switch 79 to the terminal 81 as the input signal to the ramp generator 76. When the flip-flop is in its first condition, or state, the signal applied over the lead 92 causes the switch 79 to be in its open condition thus, no signal being applied to the input terminal 81 of the ramp generator 76.

When such is required, the modulator signal may be applied to the terminal 93 and is then coupled by the coupling capacitor 94 as an additional input signal to the summing junction 72 thereby being summed with the DC input signal applied to the terminal 71. The input signal applied to the terminal 93 is an alternating current signal and therefore will cause the output of the ramp generator 76 to reach the predetermined reference signals either faster or slower depending upon the value of the voltage applied at terminal 93 at a preselected time, thereby changing the frequency of the triangular wave appearing at the terminal 56. It should be noted that although the frequency of the triangular wave is changing, the peak-to-peak amplitude thereof is not affected by the modulating signal, but is only changed as a result of change in the output voltage of the system which is applied to the terminal 87.

Figure 7:
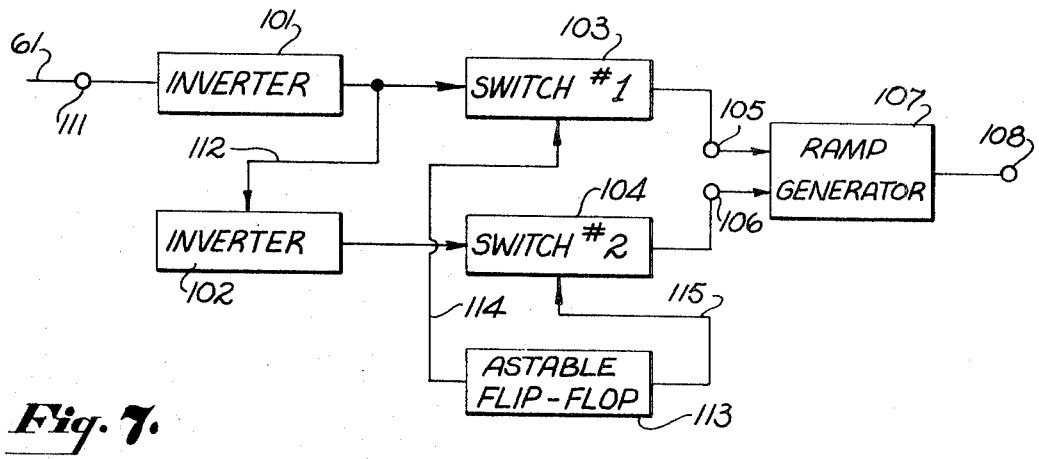
FIG. 7 illustrates in block diagram, one form which a modulator utilized in conjunction with the dither generator may take in accordance with the present invention.

A modulator useful with the circuit of the present invention as above described is illustrated in FIG. 7 to which reference is hereby made. As is shown in FIG. 7, there is provided a pair of inverters 101 and 102, the outputs of which are connected to a pair of switches 103 and 104, respectively. The output of the switches are connected to terminals 105 and 106, respectively, as inputs to the ramp generator 107. The output of the ramp generator 107 appears as an output voltage at the terminal 108 which in turn may be connected to the input terminal 93 of the triangular wave generator illustrated in FIG. 6. The input to the inverter 101 is connected through a resistor 109 from the terminal 111. As is also indicated, the signal applied to the terminal 111 is the DC output voltage from the system which is generated at terminal 66 (FIG. 5). The input to the inverter 102 is the output of the inverter 101 coupled over the lead 112. The conducting states of the switches 103 and 104 are controlled by an ostable flip-flop 113, the outputs of which are connected over the leads 114 and 115 to the switches 103 and 104 respectively.

It can be seen by comparison of FIGS. 6 and 7 that the modulator of FIG. 7 is similar in structure to the triangular wave generator of FIG. 6 with the exception that the frequency thereof is controlled by the flip-flop 113 the frequency of which remains constant. Thus, the output of the circuit shown in FIG. 7 is a triangular wave which is in turn applied to the terminal 93 of the triangular wave generator, FIG. 6, to modulate the frequency thereof.

Figure 8:
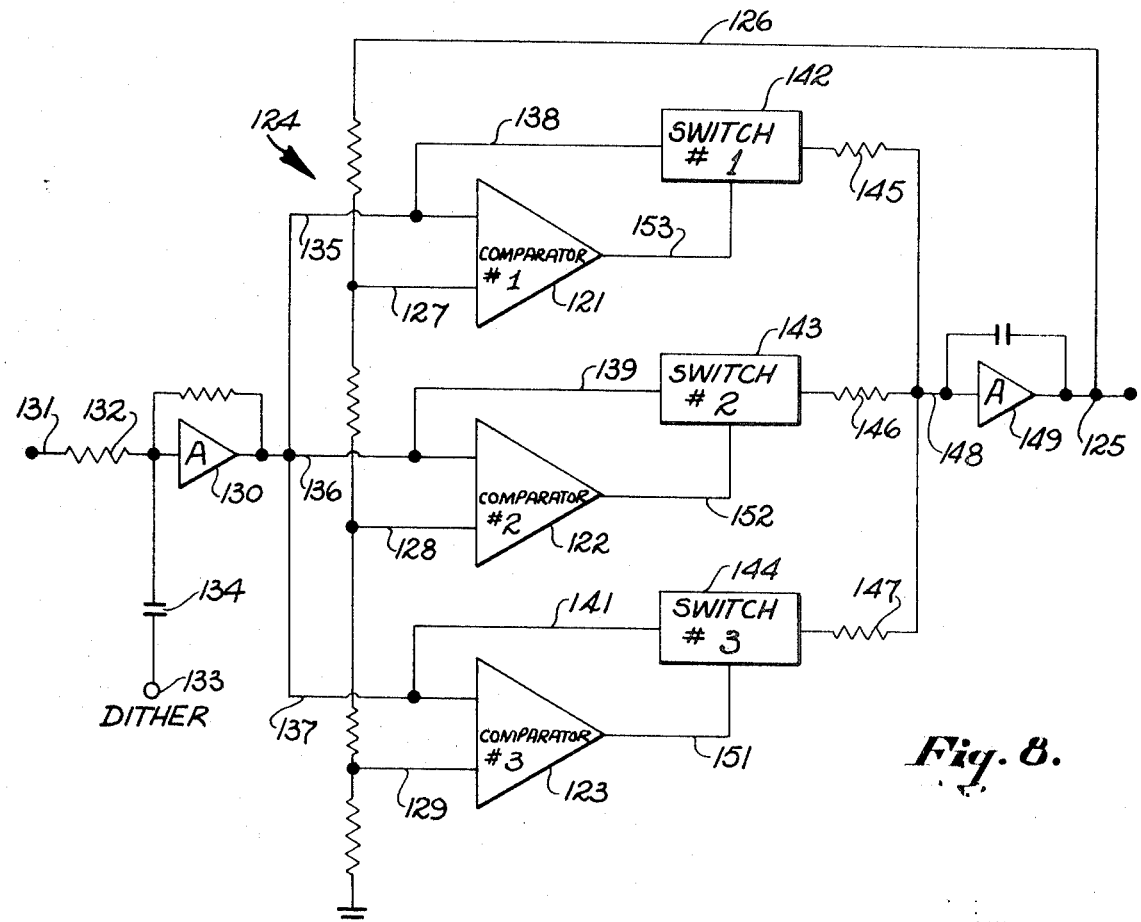
FIG. 8 illustrates in schematic form, an alternative system constructed in accordance with the present invention.

Referring now more particularly to FIG. 8, there is illustrated an alternative embodiment of a circuit constructed in accordance with the present invention, also having the characteristic of an AC to DC RMS converter. As is therein illustrated, a plurality of comparators 121, 122 and 123 are utilized to accomplish the desired conversion. A voltage divider resistive network shown generally at 124 has the DC output applied from the terminal 125 of the system as a feedback signal over the lead 126 thereto. In order to establish the conduction levels or break points of each of the comparators 121 through 123, an input terminal of each is connected to the voltage divider network 124 as shown. For example, the lead 127 of the comparator 121 to the voltage divider thus establishing a first conduction level for the comparator 121 while the leads 128 and 129 are connected at different points on the divider to establish second and third conduction levels for the comparators 122 and 123, respectively. The input signal for the circuit shown in FIG. 8 is applied to the terminal 131 and through the resistor 132 as an input to the amplifier 133. Simultaneously, dither is applied to the terminal 133 from an appropriate dither generator, as above described, and is coupled through the capacitor 134 as an input to the summing amplifier 130. Thus, the amplifier 130 sums the input signal applied to the terminal 131 and the dither signal applied to the terminal 133. The output of the amplifier 130 is then applied by way of the leads 135, 136 and 137 as the other input to the comparators 121, 122 and 123, respectively. As is shown, the input signal is also applied over the leads 138, 139 and 141 to switches 142, 143 and 144, respectively, which switches are normally open as illustrated. As is also shown, the other side of the switches are connected to summing resistors 145, 146 and 147. Thus, the signals from the comparators are summed and then applied over the lead 148 to the amplifier 149 which forms part of the active filter of the system shown in FIG. 8.

In operation, the comparators each conduct when the input signal applied thereto exceeds the bias established by the voltage divider network 124. For example, when the input signal with the dither applied thereto on the lead 137 exceeds the bias on the lead 129 connected to the comparator 123, the comparator then conducts. The output signal from the comparator 123 appears as a control signal on the lead 151 causing the switch 144 to close. Such closing of switch 144 results in applying the input signal over the lead 141 through the closed switch 144 and resistor 147 to the input of the amplifier 149. Similar operation will occur with respect to the comparator 121 and 122 in response to any signal which may be applied thereto. That is, the outputs of comparators 121 and 122 are applied over leads 153 and 152 respectively as control signals to cause switches 142 and 143 to close.

The application of the output signal by way of feedback as above described causes the break points on the comparators to vary proportional to the DC output signal which is fed back thereto in precisely the same manner as previously described with respect to the operational amplifiers. Also, the dither signal applied to the terminal 133 also causes the break points to vary in accordance with the frequency and the amplitude of the dither signal in order to cause the output of the signal as to more closely approximate the predetermined function, for example, the square-law curve, as previously described.

The dither generator which is utilized and the output of which is connected to the terminal 133 may be a generator which is frequency modulated, and of the type as previously described and generally illustrated in FIGS. 6 and 7.

What is claimed is:

1. A system for converting an applied electrical input signal to a direct current output signal which, over the range of the input signal, follows a predetermined function comprising:
converter means, including a plurality of operational rectifier means;
conduction setting means connected to said converter means for establishing the conduction level of said converter means to provide an output signal having a straight line approximation of said function;
a dither signal generator having a positive and negative going output signal having a predetermined linear distribution function;
means connecting said dither generator output signal to said conduction setting means thereby to vary the conduction level of said converter means proportional to said dither generator output signal; and
modulating means varying the frequency of said dither generator output signal.

2. A system as defined in claim 1 wherein said dither generator is a triangular wave generator.

3. A system as defined in claim 2 wherein said modulating means is a triangular wave generator.

4. A system as defined in claim 1 wherein said means connecting said dither generator include a feedback path.

5. A system as defined in claim 4 wherein said dither generator is a triangular wave generator.

6. A system as defined in claim 5 wherein said output signal of said triangular wave generator has a peak-to-peak amplitude substantially equal to the amplitude of said direct current output signal.

7. A system for converting an applied electrical input signal to a direct current output signal which, over the range of the input signal, follows a predetermined function comprising:
converter means, including a plurality of operational rectifiers each of which has a different conduction level;
conduction setting means connected to said converter means for establishing the conduction level of said converter means to provide an output signal having a straight line approximation of said function; and feedback means including a dither generator connected between said output signal and said dither generator having an output signal having a predetermined linear distribution function.

8. A system as defined in claim 7 wherein said dither generator is a triangular wave generator.

9. A system as defined in claim 8 wherein the peak-to-peak amplitude of said triangular wave is substantially equal to the amplitude of said direct current output signal.

10. A system as defined in claim 9 wherein said triangular wave generator includes ramp generator means referenced to said direct current output signal.

11. A system for converting a time-varying complex electrical input signal to DC comprising:
operational rectifier means;
first feedback means connected to apply said DC to said operational rectifier means thereby to vary the conduction level of said rectifier means proportional to said DC and second feedback means, including a dither signal generator, the output signal of which is a periodically varying signal having a substantially linear probability function, connected between said DC and said operational rectifier means thereby to apply an amplitude varying signal to said rectifier to further vary said conduction level thereof.

12. A system as defined in claim 11 wherein said dither generator further includes modulating means operatively connected to vary the frequency of said dither signal.

13. A system as defined in claim 1 wherein said conduction level of said rectifier means is established to cause said DC output to follow substantially a square-law curve.

14. A system as defined in claim 11 wherein said dither generator is a triangular wave generator.

15. A system as defined in claim 14 wherein the peak-to-peak amplitude of the output signal of said triangular wave generator is substantially equal to said DC amplitude.

* * * * *

UNITED STATES PATENT OFFICE
CERTIFICATE OF CORRECTION

Patent No. 3,628,160          Dated December 14, 1971

Inventor(s) John R. Pickering

It is certified that error appears in the above-identified patent and that said Letters Patent are hereby corrected as shown below:

Column 5, line 60, "Y1" should be -- Y1(x) -- ; line 62, "p(x2)" should read -- P(x2) -- . Column 6, line 37, before "-4", insert -- ) -- ; same line "(b+1/2)" should read -- (b-1/2) -- ; line 43, "[2(b+2-4]" should read -- [2(b+2)-4] -- . Column 10, line 59, after "output signal and" insert -- said conduction setting means, -- . Column 12, line 2, "1" should read -- 11 -- .

Signed and sealed this 14th day of November 1972.

(SEAL)
Attest:

EDWARD M. FLETCHER, JR.                ROBERT GOTTSCHALK
Attesting Officer                      Commissioner of Patents